United States Patent
Wilczek

(10) Patent No.: US 10,713,063 B1
(45) Date of Patent: Jul. 14, 2020

(54) SYSTEM AND METHOD OF SETTING A CONFIGURATION TO ACHIEVE AN OUTCOME

(71) Applicant: Coupa Software Incorporated, San Mateo, CA (US)

(72) Inventor: Donna Wilczek, Sonoma, CA (US)

(73) Assignee: COUPA SOFTWARE INCORPORATED, San Mateo, CA (US)

( * ) Notice: Subject to any disclaimer, the term of this patent is extended or adjusted under 35 U.S.C. 154(b) by 0 days.

(21) Appl. No.: 15/629,275

(22) Filed: Jun. 21, 2017

Related U.S. Application Data

(63) Continuation of application No. 15/589,982, filed on May 8, 2017.
(Continued)

(51) Int. Cl.
  *G06F 9/445* (2018.01)
  *G06N 20/00* (2019.01)

(52) U.S. Cl.
  CPC ......... *G06F 9/44505* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 6,684,191 B1 * | 1/2004 | Barnard | G06Q 10/06 705/7.11 |
| 8,204,809 B1 * | 6/2012 | Wise | G06Q 40/06 705/35 |

(Continued)

OTHER PUBLICATIONS

Wilczek, U.S. Appl. No. 15/589,982, filed May 8, 2017, Office Action, dated Feb. 20, 2020.

*Primary Examiner* — Matthew S Gart
*Assistant Examiner* — Camille M Galloway
(74) *Attorney, Agent, or Firm* — Hickman Palermo Becker Bingham LLP

(57) ABSTRACT

A method for improving performance of a computer procurement application includes using the procurement control system computer, determining a peer group associated with a first entity, the peer group including entities that have one or more attribute values in common with the first entity; using a procurement control system computer, obtaining, from client computers respectively associated with the entities, configurations that instruct a procurement application how to perform procurement tasks for the respective entities of the entities in the peer group; using a procurement control system computer, obtaining, from a first client computer associated with the first entity, a first configurations that instruct the procurement application how to perform procurement tasks for the first entity; using the procurement control system computer, determining, from Key Performance Indicators (KPI values) of the entities in the peer group and of the first entity, one or more KPI values of the first entity that are relatively lower than the one or more KPI values of the entities in the peer group; using the procurement control system computer, from the one or more KPI values of the first entity determining one or more of the configurations associated with the first entity that affect the one or more KPI values of the first entity; using the procurement control system computer, determining, for each configuration of the configurations, a configuration value associated with a threshold number of the entities in the peer group; using the procurement control system computer, providing a description of the configuration value to the client computer associated with the first entity.

16 Claims, 7 Drawing Sheets

Related U.S. Application Data

(60) Provisional application No. 62/333,731, filed on May 9, 2016.

(56) References Cited

U.S. PATENT DOCUMENTS

| | | | | |
|---|---|---|---|---|
| 2002/0174000 | A1* | 11/2002 | Katz | G06Q 10/06316 |
| | | | | 705/7.26 |
| 2003/0149578 | A1* | 8/2003 | Wong | G06Q 10/06312 |
| | | | | 705/7.22 |
| 2005/0234931 | A1* | 10/2005 | Yip | H04L 41/0816 |
| 2005/0289071 | A1* | 12/2005 | Goin | G06F 11/008 |
| | | | | 705/56 |
| 2007/0100892 | A1* | 5/2007 | Kephart | G06Q 10/06 |
| 2007/0203589 | A1* | 8/2007 | Flinn | G06Q 10/06 |
| | | | | 700/29 |
| 2008/0066072 | A1* | 3/2008 | Yurekli | G06Q 10/06 |
| | | | | 718/104 |
| 2008/0300959 | A1* | 12/2008 | Sinha | G06Q 10/10 |
| | | | | 705/7.31 |
| 2009/0055382 | A1* | 2/2009 | Kerschbaum | G06Q 10/06 |
| 2010/0299174 | A1 | 11/2010 | Guha | |
| 2013/0238641 | A1 | 9/2013 | Mandelstein | |
| 2013/0246129 | A1* | 9/2013 | Chandrasekaran | G06Q 10/06 |
| | | | | 705/7.36 |
| 2014/0095268 | A1* | 4/2014 | O'Connor | G06Q 10/06393 |
| | | | | 705/7.39 |
| 2014/0229588 | A1 | 8/2014 | Hjelm | |
| 2016/0048791 | A1* | 2/2016 | Kadakia | G06Q 10/06316 |
| | | | | 705/7.26 |
| 2017/0220930 | A1 | 8/2017 | Hachmeister | |
| 2018/0330301 | A1* | 11/2018 | Mole | G06Q 10/06393 |

\* cited by examiner

SYSTEM AND METHOD OF SETTING A CONFIGURATION TO ACHIEVE AN OUTCOME

BENEFIT CLAIM

This application is a continuation and claims the benefit under 35 U.S.C. § 120 of U.S. patent application Ser. No. 15/589,982, filed May 8, 2017, which claims the benefit of U.S. Provisional Patent Application 62/333,731, filed May 9, 2016, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE DISCLOSURE

The present disclosure relates to managing data relating to configuration settings in computer systems and, more specifically, to providing recommended configuration settings from one computer to another.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Business entities, such as companies, schools, hospitals, and government agencies typically have sophisticated systems for managing their financial accounts. These account management tools are used among a variety of businesses in various industries, revenues, and number of employees. The entities may have accounts receivable (AR) and accounts payable (AP) departments that are in charge of invoicing and payments, respectively. These departments use technology tools to manage these accounts in a timely and accurate manner.

The technology tools used by these entities have a number of different settings and configurations that are set by an administrator and represented in stored digital data values. The settings and configurations may drive workflow processes for the entity and unintentionally create inefficiencies that slow down or halt invoicing and payments within the entity. The inefficiencies may incur costs on the entity such as a loss of discounts, late fees, rush fees, or other costs. Therefore, there is a need to improve digital data entry and management for configuration data values or settings.

DETAILED DESCRIPTION

Figure 1:
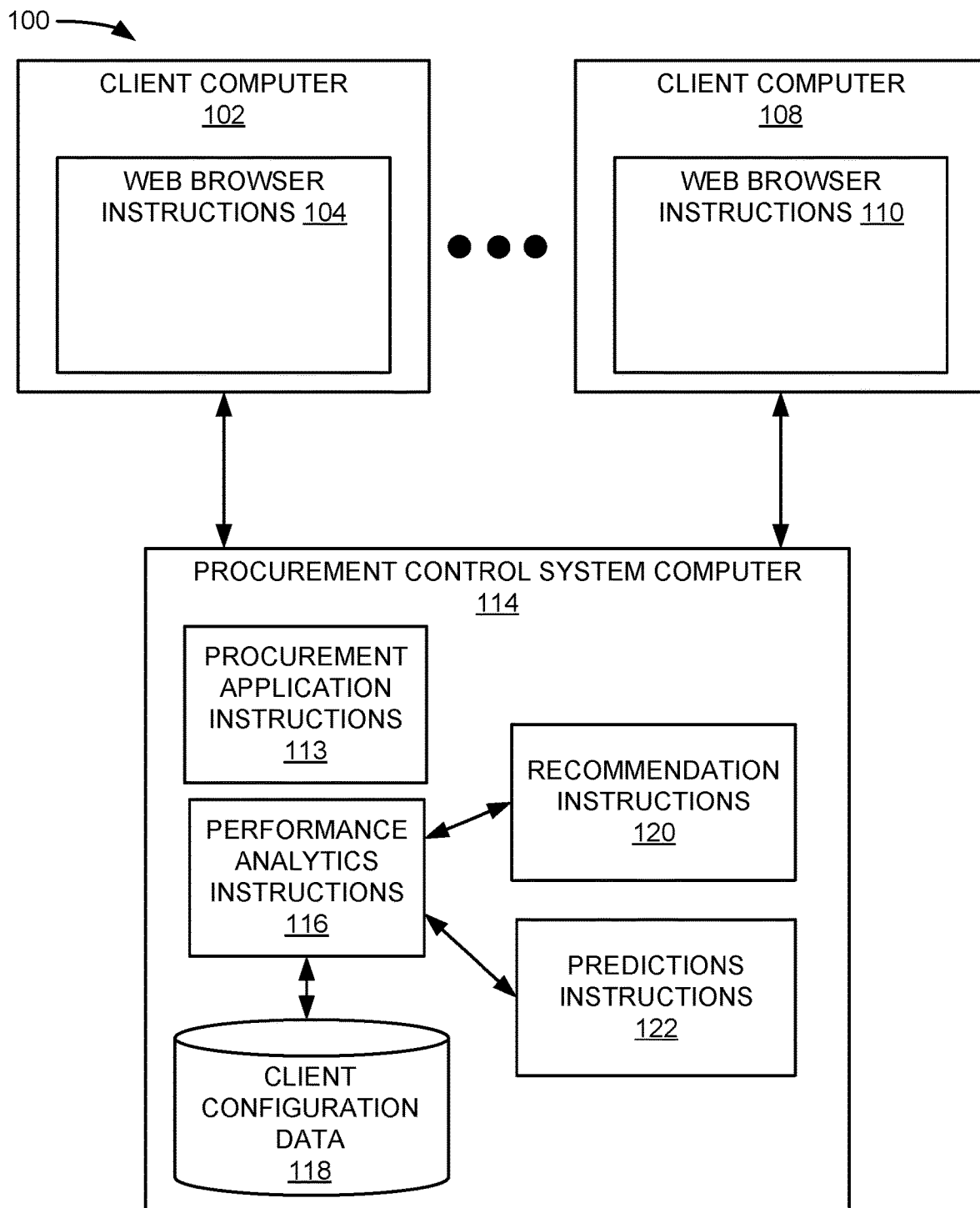
FIG. 1 is a block diagram of an example network environment in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections according to the following outline:

1.0 NETWORKED ENVIRONMENT
2.0 METHOD OF PROVIDING RECOMMENDATIONS
3.0 METHOD OF PREDICTING OUTCOMES
4.0 HARDWARE OVERVIEW

1.0 Networked Environment

Procurement control computer systems allow entities to control expenses, and the consumption of data processing resources involved in purchasing processes, by directing messages about purchases to preferred vendors, and enforcing approval chains or other workflow constraints using computer-based controls. This disclosure focuses on technical improvements in such procurement control systems. In one embodiment, a procurement control system implemented as an online, networked Software-as-a-Service (SaaS) system is disclosed. The procurement control system may be implemented using a virtualized data center that hosts or executes a plurality of instances of the system, to which multiple different entities or tenants connect. A shared multi-tenant database may be accessible to the procurement control system for purposes of secure storage of different data of unrelated or competing entities or tenants.

The procurement control system has a number of configuration data values or settings that can be set by an entity or tenant of the system. These configuration values include workflow settings such as a required number of approvals before an expense is paid, a time limit for approving payment of expenses, discounts applied, and the like. Configuration data may be stored in a discrete configuration file that can be edited, or in a database or other repository for which the procurement control system controls access.

The procurement control system may provide recommendations to an administrator for setting the configuration settings. Particular configuration settings may be recommended based on factors such as revenue, number of employees, and industry. The configuration settings may be recommended based on a relative performance of other entities that have the same procurement control system in operation, and have set its configuration settings in a particular way. In other embodiments, the procurement control system allows an administrator to predict the effect of changes in configurations settings in terms of business outcomes, such as an amount of money that is saved or time that is saved and attributable to the proposed change.

The procurement control system described herein provides numerous technical advantages. One example is reduced use of memory, CPU cycles and other resources, resulting in improved machine efficiency. In some prior approaches, administrators set configuration settings based on informal rules or anecdotes without evidence of the actual or predicted effects of the configuration settings. In sharp contrast, the predictive capability of the present disclosure enables computers to select or input configuration settings with consideration of the effect of the result; therefore, networked computers connected to a procurement control system use fewer network messages, buffer memory, CPU cycles and other resources to repeatedly adjust configuration settings. In an embodiment, a procurement control system provides visibility into the configuration settings of peer entities, which otherwise do not share confidential internal configuration data, by displaying an aggregate of the configuration settings that have been collected from a plurality of different entities, and the relative performance of the peer entities. Prior systems could not provide such data.

1.0 Networked Environment

FIG. 1 is a block diagram of an example network environment in which various embodiments may be implemented.

In an embodiment, a networked environment 100 includes two or more client computers 102, 108 in electronic communication with a procurement control system computer 114. Although the procurement control system computer 114 is shown as a single computing device in FIG. 1, various instructions and a client configuration data store 118 shown as belonging to the procurement control system computer 114 may exist on more than one computing devices that operate in tandem to provide the features of the procurement control system computer 114. The client computers 102, 108 may broadly represent computers, workstations, processes or browsers that logically act as clients of the procurement control system computer 114. The networked environment 100 may be connected via one or more local area network links, a wide area network (WAN), internetwork or a combination. Any number of client computers 102, 108 may be provided in various embodiments and FIG. 1 depicts two client computers merely to illustrate a clear example.

The procurement control system computer 114 is in electronic communication with the client computers 102, 108. Users of the client computers 102, 108, may be different persons or entities whose procurement activities are managed by a procurement application. In an embodiment, the client computer 108 is associated with a second entity that is distinct from a first entity associated with the client computer 102. Different entities may be different organizations, companies, business units, or other categories of different users that may access the procurement control system computer 114 to manage their procurement needs.

The first client computer 102 includes web browser instructions 104 that are executed by the client computer 102. The web browser instructions 104 allows the first client computer 102 to access features provided by the procurement control system computer 114. Similarly, the second client computer 108 includes web browser instructions 110 that allow access to features provided by the procurement control system computer 114. The web browser instructions 104 may be embodied in commercially available products such as CHROME, SAFARI, EDGE, INTERNET EXPLORER, or FIREFOX.

Users of the client computers 102, 108 may supply different configuration data to the procurement control system computer 114. The configuration data may be stored at least partially or wholly on the client computers 102, 108, on the procurement control system computer 114, or data storage devices not shown in FIG. 1. Based on configuration data supplied by the client computers 102, 108, the procurement control system computer 114 may provide recommendations to change one or more of the configuration data supplied to the procurement control system computer 114 and predict how changes to one or more of the configuration data may affect performance of the procurement application. Because the procurement control system computer 114 has access to the configuration data for different users or entities, the procurement control system 114 performs work previously performed by a consultant to provide advice regarding the configuration data supplied by each user or entity. The automatic, without human intervention, provisioning of the recommendations and predictions that affect the performance of the procurement application is as technical solution to the technical problem of setting the configurations.

The procurement control system computer 114 includes procurement application instructions 113 that manages procurement data on behalf of an entity registered with the procurement control system computer 114. For example, the procurement application instructions 113 may be executing on the procurement control system 114 or other computing devices not shown in FIG. 1. The procurement application may include different executing instances of the procurement application, a single executing instance of the procurement application that supports a multi-tenant architecture, or a combination of these. In the multi-tenant architecture, although a single instance of executing code may support procurement features for multiple entities, information provided by each respective entity to the procurement application is not directly shared to other entities.

Procurement data may include data associated with purchase orders, requisitions, accounts payable, and invoice processing. Examples of procurement data includes purchase orders, requisition requests, invoices received from vendors, expense reimbursement requests, and reports assembled from the procurement data. The procurement data may be partially or completed stored on, or locally to, the client computer 102 or the procurement control system computer 114.

The procurement application instructions 113 may manage workflows associated with procurement. An example workflow may be a purchase order approval workflow that includes a series of steps to be completed before a purchase order is approved and can be ordered. In the purchase order workflow, one or more approvals may be required from various actors within the entity depending on characteristics of the workflow such as the products being ordered, an amount of the purchase order, a department associated with the purchase order, the origin of the purchase order, and the like. The procurement application instructions 113 monitors the progress of the purchase through the workflow.

As one example, a user at the client computer 102 provides information through a web browser instance created using the web browser instructions 104. The user provides configuration data to the web browser instance, which is in turn transferred to the procurement control system computer 114. Configurations are settings within the procurement application instructions 113 that describe how the entity manages its procurement operations. Examples of configurations include payment terms, workflows, a number of steps to complete a particular task, and tolerances. The configurations are different than information provided by a user to establish a procurement task. For example, in a purchasing order managed by the procurement application, the persons from who approval is needed before the purchasing order is approved may be specified by the configuration, but the actual item or price of item to be purchased is provided separately.

In some embodiments, there are over one million permutations within configuration data that may be provided by users at the client computer 102. Because the configuration data affects the technical operation of the procurement application 113, setting the configuration data constitutes a technical problem. In an embodiment, the configuration data is set by an administrator using various user interfaces having interface elements. Examples of interface elements include, but are not limited to, check boxes, drop-down menus, drag and drop selections, radio buttons, and text fields. Configuration values are stored in persistent databases or tables that associates the selected or specified configuration data values with the client computer that has selected those values. The configuration data may be stored at the client configuration data store 118. When the same user or another user associated with the same entity registers with the procurement control system computer 114, the configuration data may be retrieved by the procurement application instructions 113 and applied to supplied procurement data.

Performance analytics instructions 116 includes executable code to analyze key performance indicators (KPI values) based upon configuration data supplied by client computers 102, 108. Each KPI is a digitally stored digital data value that is computed in a specified way. The KPI values may be measured by the procurement application instructions 113 and processed using the performance analytics instructions 116. In other embodiments, performance analytics instructions 116 may be executed to monitor the performance of the procurement application instructions 113 and generate the KPI values itself. KPI values include, for example, statistical data values indicating an amount of time to complete a task, amount of discounts applied, or other measures. For example, one KPI may be Purchase Requisition to Purchase Order (Purchase Requisition Approval) Cycle Time, measured in hours. Other KPI values include, but are not limited to savings rate, contract compliance rate, supplier acknowledgement rate, active supplier ratio, e-invoice rate, invoice processing cost, and invoices per full time employee (FTE).

Client configuration data 118 may store configuration values set by the client computers 102, 108. Client configurations may include additional information about the entity associated with the client such as revenue, number of employees, and industry.

Recommendation instructions 120 are configured to compare KPI values and configurations associated with various entities to provide recommendations for setting or changing configuration data supplied by the client computers 102, 108. The recommendation instructions 120, via the executing performance analytics instructions 116, accesses the KPI values of similar entities and compares the KPI values with those of a target entity, for example, the entity associated with client computers 102, 108, to provide recommendations to the target entity. The recommendation instructions 120 identifies one or more KPI values associated with the target entity in which the target entity lags behind its peer entities. Peer entities are entities that are within a same category as the target entity in terms of revenue, number of employees, and/or industry. The recommendation instructions 120, using supplied configuration data associated with the peer entities, identifies configuration data supplied by the target entity using the client computer 102, 108 and determines how they differ from those of the peer entities. The identified configuration data may include configuration data that is known to affect the KPI values in which the target entity lags.

The recommendation instructions 120, using the identified configurations, generates a user interface or user interface elements that can be used by an administrator to modify the identified configurations. The recommendation instructions 120 may assemble some information about he identified configuration, such as corresponding configurations associated with the peer entities, text describing a causal relationship between the identified configuration and the KPI, and a recommended configuration for the target entity. The user interface elements may include an option to modify the configuration according to the recommendation.

Predictions instructions 122 may access the performance analytics separately from the recommendation instructions 120. The predictions instructions 122 receives, from the client configuration data 118, a description of a desired goal or end result. The predictions instructions 122, accesses performance data of the peer entities, identifies peer entities who have achieved the desired goal or end result, and accesses configuration data of those peer entities. The predictions instructions 122 determines which configurations of the configurations that have a causal relationship to the desired goal. The predictions instructions 122 compares the configuration data to the configuration data of the target client and identifies any differences. The predictions instructions 122 generates a user interface or user interface elements to present the differences of configuration data to an administrator. The predictions instructions 122 may further provide an explanation of the causal relationship and the predicted effect of the recommended change in configuration.

2.0 Method of Providing Recommendations

Figure 2:
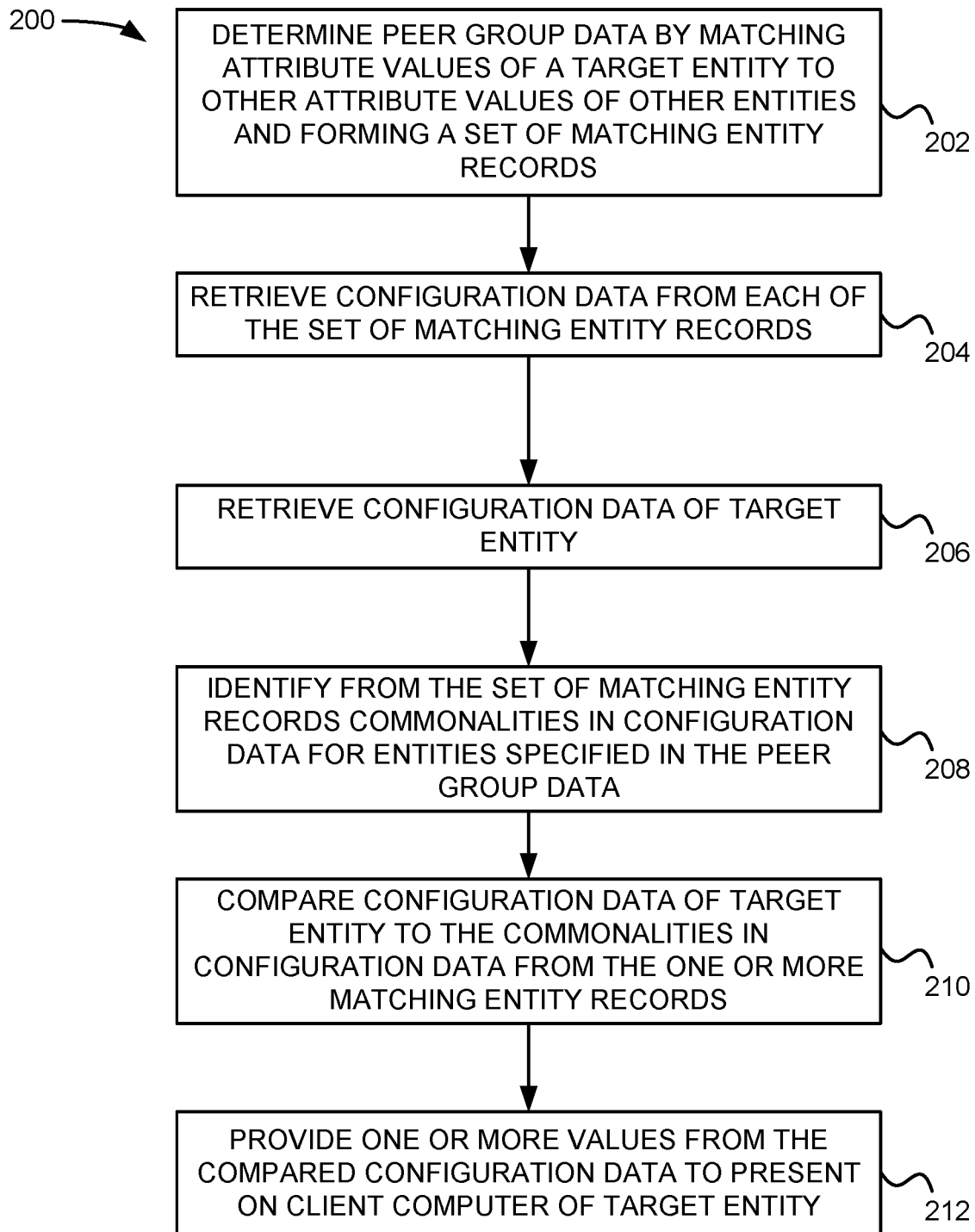
FIG. 2 illustrates an algorithm or process for providing a recommended configuration setting.

FIG. 2 illustrates an example computer process for providing a recommended configuration setting in one embodiment. FIG. 2, and each other flow diagram herein, is intended to disclose an algorithm, plan or outline that can be used to implement one or more computer programs or other software elements which when executed cause performing the functional improvements and technical advances that are described herein. Furthermore, FIG. 2 and each other flow diagram herein is described at the same level of detail that persons of ordinary skill in the art ordinarily use to communicate with one another about algorithms, plans, or specifications forming a basis of software programs that they plan to code or implement using their accumulated skill and knowledge.

In an embodiment, a process 200 of FIG. 2 is implemented using, and executed by, the recommendation instructions 120 to provide one or more recommended configurations within the procurement application instructions 113 for a target entity. For example, the target entity may be a client computer 102 that is associated with the target entity, such as an administrator computer that supplies configuration data to the procurement application instructions 113.

In some embodiments, the recommendation engine 120 may initiate the process 200 according to a schedule or if a triggering event occurs. Examples of triggering events include, but are not limited to, detecting that the procurement control system computer 114 is accessed by the first time at client computer 102, a software update made to the procurement application instruction 113, or determining that a KPI associated with the target entity has met a threshold.

In operation 202, the recommendation instructions 120 are programmed to determine peer group data by matching attribute values of the target entity to other attribute values of other entities and forming a set of matching entity records. The peer group data may be identified using attribute values that are supplied by each respective entity that uses the procurement application instructions 113 to manage their procurement needs within the networked environment 100. For example, the attribute values may be values provided by an entity during a sign-up process with the procurement application or during routine updates to entity information requested by the procurement application. The peer group includes two or more entities that are similar in some way to that of the target entity. The attribute values may comprise, for example, a revenue value, number of employees, an industry value or a vertical market value.

The recommendation instructions 120 are programmed to identify entities that are similar to the target entity or have similar characteristics. For example, entities within the peer group may have a number of employees that is within the same range as the number of employees of the target entity or may belong to the same vertical. Likewise, entities within the peer group may have a revenue that is within the same range as that of the target group. In some embodiments, other methods to identify entities within a peer group may include identifying entities having revenue or a number of employees within plus-or-minus a threshold number of revenue or employees of the target entity.

The respective members of the peer group are not identified to the target entity and remain anonymous. To maintain anonymity, a peer group may be defined as having no fewer than a threshold number of peer entities. The target entity may itself be a member of its peer group.

In an operation 204, the recommendation instructions 120 are programmed to retrieve or extract configuration data from each of the set of matching entity records. The configuration data may be accessed from client configuration data 118.

In an operation 206, the recommendation instructions 120 are programmed to retrieve configuration data for the target entity. The configuration data may be accessed from client configuration data 118.

In an operation 208, the recommendation instructions 120 are programmed to identify, from the set of matching entity records, one or more shared characteristics or commonalities in the configuration data for the entities that are specified in the peer group data. The commonalities may be values specified by the configuration data that a threshold number of peer entities have individually selected for use within the procurement application. The configuration values may include binary values. For example, the binary value may indicate whether a Chief Executive Officer is required before a purchase order is approved that are above a specified amount. The commonalities may comprise a set of two or more related configuration values that, when set together, have a synergistic effect. In some instances, the configuration values may be a selection from a set of two or more possible values that are defined by the procurement application. For example, if a set defines persons in a company who are needed to approve a particular purchase, the procurement system may offer as options a Chief Executive Officer, other executive level employees, direct supervisors, or other members. In some instances, a commonality may be represented by a single configuration value. In other instances, a commonality may be represented by two or more configuration values that represent a range within a subset of the available configuration values for a particular configuration, such as a range of integer values.

In an operation 210, the recommendation instructions 120 are programmed to compare configuration data of the target entity to the commonalities in configuration data from the one or more matching entity records. The recommendation instructions 120 may determine which configuration data values of the target entity differ from the commonalities. In some instances, the recommendation instructions 120 may determine, for example, that the configuration data values associated with the target entity do not match those of a majority of its peers.

The recommendation instructions 120 may further assemble, from data provided by the performance analytics instructions 116, KPI values for the peer entities that are related to the configurations. For example, the recommendation instructions 120 may have, stored in a non-volatile digital memory, a table that associates one or more KPI values to one or more of the configuration data provided by entities that use the procurement application. For example, a KPI "PO Cycle Time" may be associated with configurations for "IT Requisition Approval" and "Requisition User Self-Approval Limits".

The recommendation instructions 120 may present the KPI values of the peer entities in a graphical element that depicts the relative performance of the target entity based on its KPI values.

In an operation 212, the recommendation instructions 120 are programmed to provide, via a graphical user interface, one or more values from the compared configuration data to present on a client computer of the target entity. The one or more values may represent a recommendation that the target entity may use to improve the present configuration data values used by the target entity in the procurement application. The recommendation may include a suggestion to change one or more of the configuration data, an option to change one or more of the configuration data, and graphical elements that compare the associated KPI values of the peer entities to the corresponding KPI values of the target entity. The recommendations may include changing, more than one configuration value such that a synergistic effect on the KPI values may be achieved. An example of a recommendation may include:

| KPI | You (Customer A) | vs Everyone (All Other Customer Averages) |
|---|---|---|
| PO Cycle Time | 24 hours | vs 12 hours |

With this KPI, a smaller number in hours is better than more. Based on the foregoing, target entity Customer A can infer that they need improvement. The recommendations may include:

"Your requisition approval workflows are configured with have an average of 6 approval steps and your peer set (selectable by you), have an average of 4 steps. Click here to review and modify the configuration of your workflows." and "Your requisition user self-approval limits average $50 and your peer set (selectable by you), has an average of $100. Click here to review and modify your requisition user self-approval limits."

The exact KPI values and recommendations may vary in different embodiments. In an embodiment, recommendation instructions 120 provides specific recommendations for changes and links to specific features, functions or areas of a procurement configuration that can be accessed to modify specific configuration variables in response to the recommendations.

Figure 3:
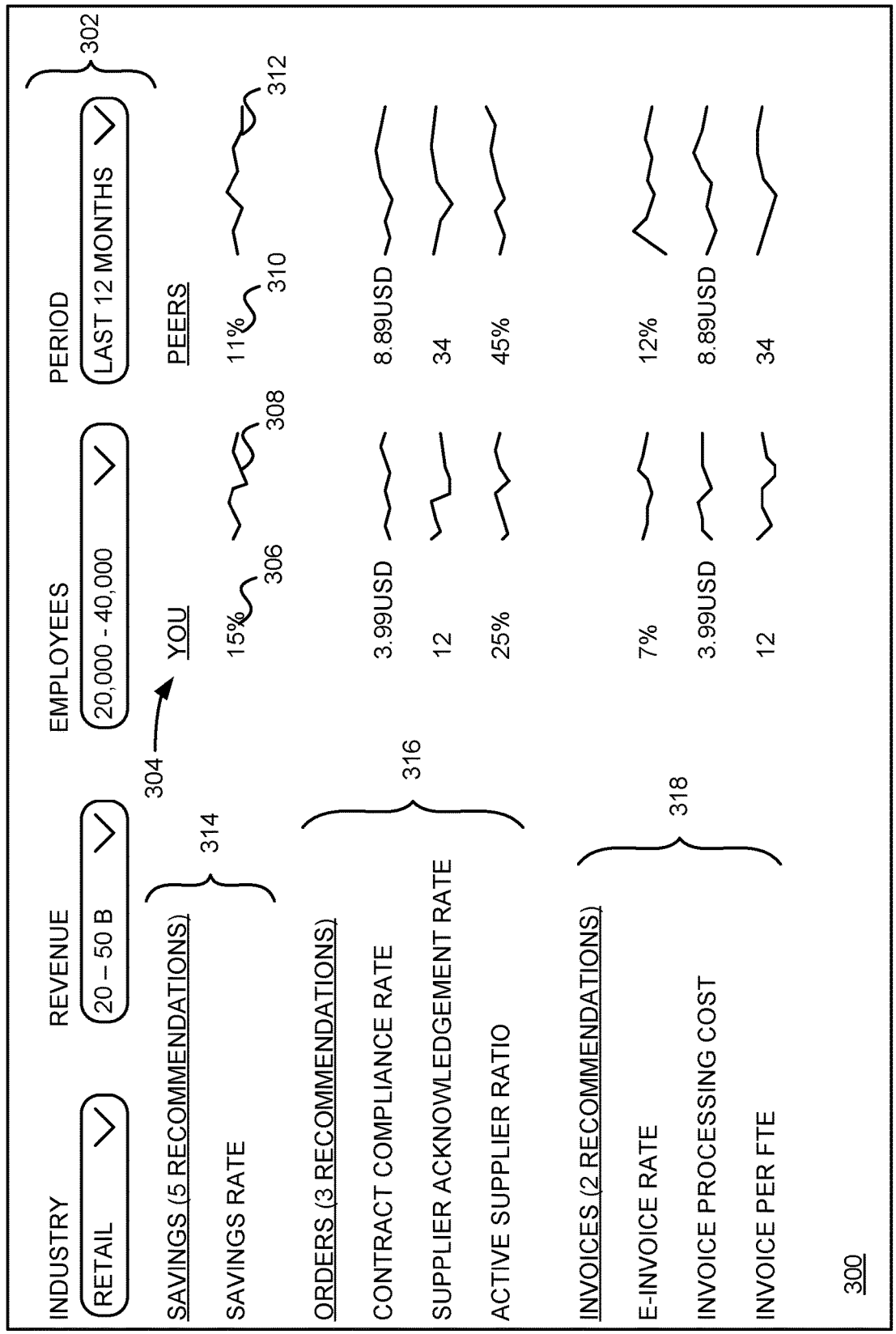
FIG. 3 depicts a portion of a computer screen display that may be generated by computer for depicting various metrics within an account management application.

FIG. 3 depicts a portion of a user interface depicting various KPI values within a procurement application.

In an embodiment, a user interface 300 presents the KPI values of the entity associated with the client computer 102 and the peer entities. The user interface 300 may provide one or more recommendations in response to input received by the client computer 102.

Element 302 is a set of drop-down menus using which, the procurement application may select desired characteristics of the entities in its peer group. The user interface 300 includes drop-down menus for "industry", "revenue", "employees", and "period". The drop-down menus within element 302 may include two or more selectable options. The client computer 102 may select attributes from the drop-down menus that are similar to the attributes of the target company.

Element 304 is a table of KPI values that include the KPI values of the target entity 306 and the aggregated KPI values of the entities in the peer group 310. The KPI values of element 304 may be accompanied by trend lines 308 and 312. Trend line 308 is a graphical element that describes the KPI of the target entity over the time period selected in element 302. Trend line 312 is a graphical element that describes the aggregated KPI of the peer group 310 over the time period selected in element 302.

Element 314 is a first group of KPI values. The element 314 corresponds to a group of KPI values, "Savings", that is associated with one KPI, "Savings Rate". The first group of KPI values is further associated with five recommendations for improving the KPI values therein.

Element 316 is a second group of KPI values. The element 316 corresponds to a group of KPI values, "Orders", that is associated with three KPI values: "Contract Compliance Rate", "Supplier Acknowledgement Rate", and "Active Supplier Ratio". The second group of KPI values is further associated with three recommendations for improving the KPI values therein.

Element 318 is a third group of KPI values. The element 316 corresponds to a group of KPI values, "Invoices", that is associated with three KPI values: "E-Invoicing Rate", "Invoice Processing Cost", and "Invoice Per FTE", where "FTE" is an acronym for "Full Time Employee". The third group of KPI values is further associated with two recommendations for improving the KPI values therein.

Figure 4:
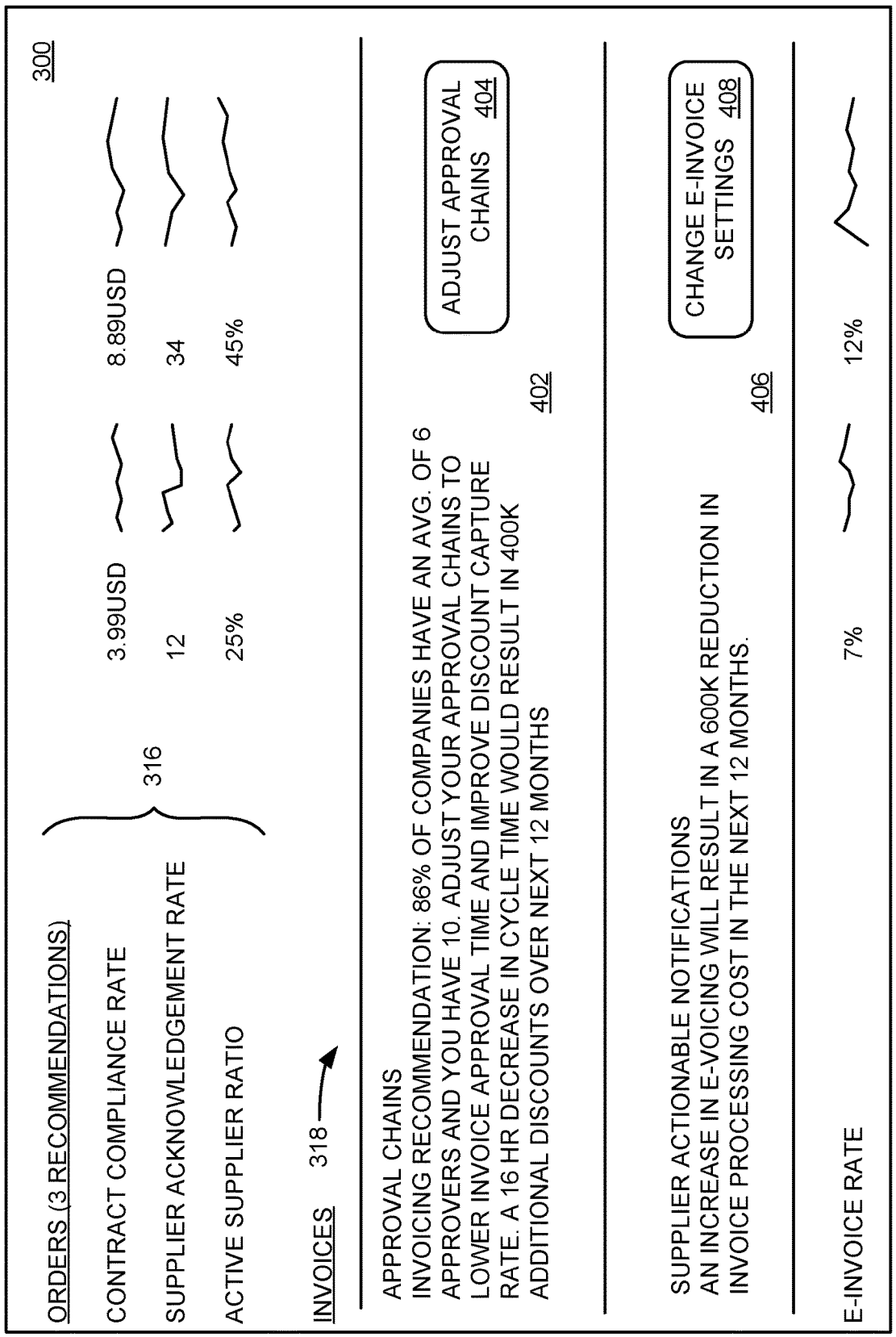
FIG. 4 depicts a portion of a computer screen display depicting various metrics and recommendations within an account management application.

FIG. 4 depicts a portion of the user interface of FIG. 3 depicting various metrics and recommendations within an account management application.

FIG. 4 includes one or more recommendations expanded within user interface 300. In FIG. 4, element 318 is expanded to display two recommendations 402, 406 identified using the method of FIG. 2. The recommendations 402, 406 are associated with the KPI "Invoices".

The recommendation 402 recommends changing the setting "Approval Chains" and includes an optional explanation: "Invoicing recommendation: 86% of companies have an avg. of 6 approvers and you have 10. Adjust your approval chains to lower invoice approval time and improve discount capture rate. A 16 hr decrease in cycle time would result in 400 k additional discounts over next 12 months." The explanation may include the setting identified within the peer group, an expected result of changing the setting, and/or a quantitative prediction resulting from changing the setting in accordance with the recommendation. The recommendation 402 further includes a button 404. Upon selection of the button 404, the setting may be displayed such that the setting can be changed or is automatically changed on behalf of the target entity.

The recommendation 406 recommends changing the setting "Supplier Actionable Notifications" and includes an optional explanation: "an increase in e-voicing will result in a 600 k reduction in invoice processing cost in the next 12 months." The recommendation 406 further includes a button 408. Upon selection of the button 408, the setting may be displayed such that the setting can be changed or is automatically changed on behalf of the target entity.

3.0 Method of Predicting Outcomes

Figure 5:
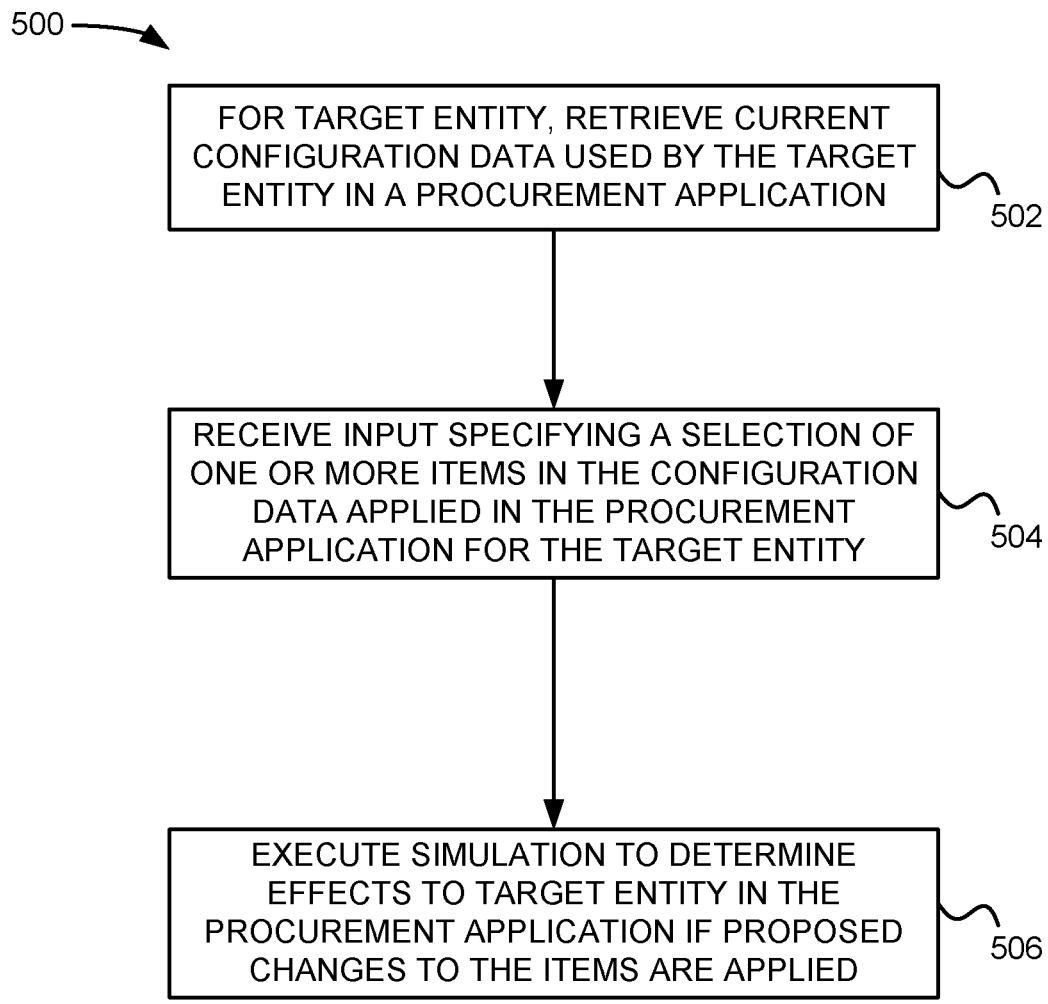
FIG. 5 illustrates an algorithm or process for providing an outcome-based recommendation.

FIG. 5 is a flowchart of an example process for providing an outcome-based recommendation, in one embodiment.

A process 500 of FIG. 5 provides a "what-if" analysis using a What-if modeler program executed by the predictions instructions 122. The What-if modeler program is programmed to display aspects of impact settings on business KPI values, including showing links to exactly the configuration changes that are likely to achieve the results. This method may allow a target entity to determine how close or far, in terms of their configuration data, they are to a desired goal or outcome.

In an operation 502, performance analytics instructions 116, for a target entity, retrieves current configuration data used by the target entity in a procurement application. Performance analytics may access some or all of the configuration data associated with the target entity. The configurations may be provided within a user interface within the procurement application.

In an operation 504, performance analytics instructions 116 receives input specifying a selection of one or more values in the configuration data applied in the procurement application for the target entity. The input may be associated with one or more configuration data values, including sets of configuration data values or configuration data having more than one sub-configuration. The selection may be made using a variety of user interface elements including, for example, radio buttons, numerical entry fields, text entry fields, and checkboxes. The selections can be made to one configuration at a time or to multiple configurations at a time. The selections may be made across different groups of KPI values or across KPI values.

In an operation 506, the predictions instructions 122 executes a simulation to determine effects to target entity in the procurement application if proposed changes to the values are applied. For example, the predictions instructions 122 accesses KPI values of peer entities, identifies peer entities who have achieved a desired goal or end result, and accesses configuration data of those peer entities. The predictions instructions 122 determines which configuration data values of the configuration data have a causal relationship to the desired goal. The predictions instructions 122 compares the configuration data of the target entity and identifies any differences. The predictions instructions 122 generates a user interface or user interface elements to present the differences within the procurement application to an administrator. The predictions instructions 122 may further provide an explanation of the causal relationship and the predicted effect of the recommended change in configuration.

In some embodiments, the KPI values of the peer entities may be analyzed using statistical models such as averages, median, mode, range, linear regression, and correlations such as r-squared values.

In some embodiments, the KPI values of the peer entities may be analyzed using machine learning or artificial intelligence techniques. The KPI values and configurations associated with the peer entities and the target entity, and the selection of operation 504 are provided as input into a machine learning algorithm. The machine learning algorithm provides, as output, a quantitative result predicted from the selection of operation 504. Examples of machine learning techniques that can be used include supervised learning, unsupervised learning, and reinforcement learning. Some embodiments may perform machine algorithms including, but not limited to, linear regression, logistic regression, decision tree, Support Vector Machine (SVM), Naïve Bayes, K-Nearest Neighbors (KNN), K-means, Random Forest, Dimensionality Reduction Algorithms, and Gradient Boost & Adaboost.

In the PO Cycle Time scenario described above, an example what-if scenario is, "what if I want to get my PO Cycle Time down to 2 hours." While this query is phrased in business terms, it requires changes in computer functionality to achieve. In response, the modeler program is programmed to generate and displays specific configuration data recommendations that change the functionality of the procurement control systems. Example configuration data recommendations include:

Your IT requisition approval workflow would need to change to remove the final approver step and move to a two-level flow. Click here to review and modify the configuration of your workflows. (A hyperlink may be generated and displayed, which when selected, causes directly electronically accessing that part of the procurement control system that provides functions for configuring workflow operations.)

Your requisition user self-approval limits average $50, and you would need to increase your average to $259. Click here to review and modify your requisition user self-approval limits. (A hyperlink may be generated and displayed, which when selected, causes directly electronically accessing that part of the procurement control system that provides functions for configuring workflow operations.)

Figure 6:
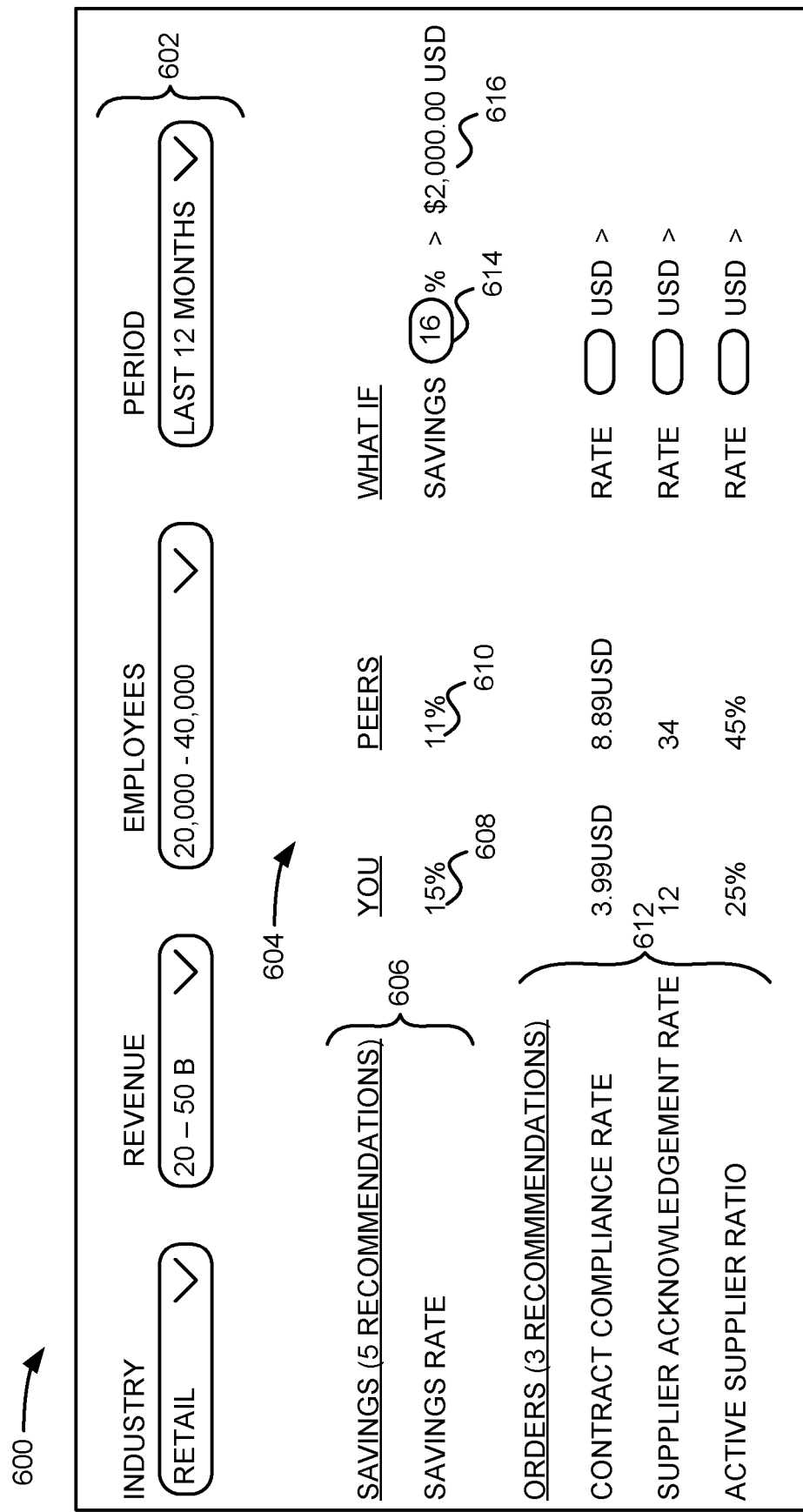
FIG. 6 depicts a portion of a computer screen display depicting an effect of a change in configuration settings within an account management application.

FIG. 6 depicts a portion of a user interface depicting an effect of a change in configuration settings within an account management application.

Element 602 is a set of drop-down menus that are programmed to receive selections of desired characteristics of the entities in a peer group. The user interface 300 includes drop-down menus for "industry", "revenue", "employees", and "period". The drop-down menus within element 302 may include two or more selectable options. The client computer 102 may select attributes from the drop-down menus that are similar to the attributes of the target company.

Element 604 is a table of KPI values that include the KPI values of the target entity 608 and the aggregated KPI values of the entities in the peer group 610.

Element 606 is a first group of KPI values. The element 606 corresponds to a group of KPI values, "Savings", that is associated with one KPI, "Savings Rate". The first group of KPI values is further associated with five recommendations for improving the KPI values therein.

Element 612 is a second group of KPI values. The element 612 corresponds to a group of KPI values, "Orders", that is associated with three KPI values: "Contract Compliance Rate", "Supplier Acknowledgement Rate", and "Active Supplier Ratio". The second group of KPI values is further associated with three recommendations for improving the KPI values therein.

Element 614 is a user interface element, a numerical entry field, in which the client computer 102 may select a change in configuration. In FIG. 6, client computer 102 displays an input of "16%" for configuration "Savings Rate". Element 606 is a quantitative prediction of "$2,000" as a result of the target entity achieving a savings rate of 16%. To change the configurations that would result in this savings rate, the client computer A may select the "5 Recommendations" to display the recommendations as described in connection with FIG. 4.

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
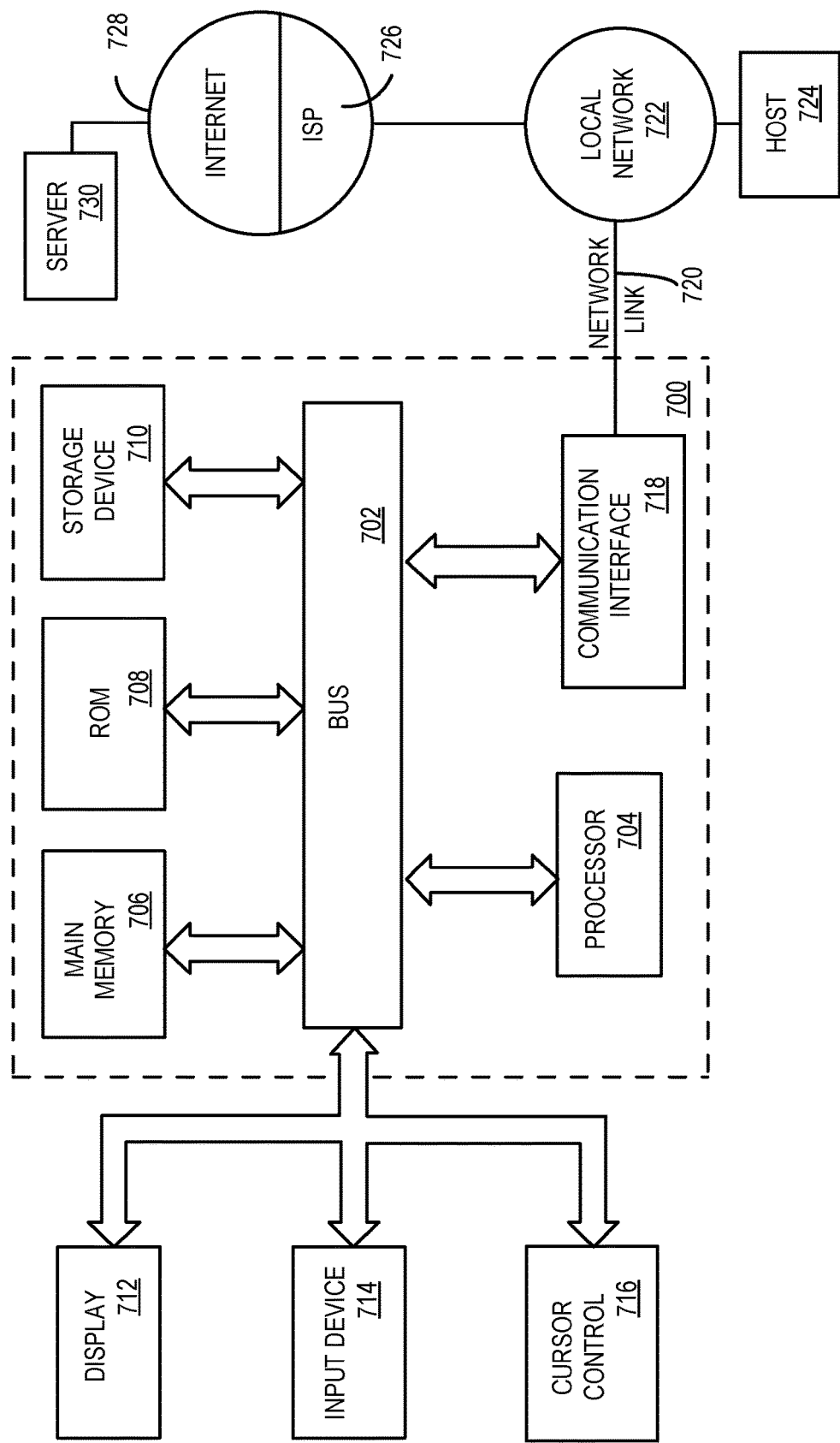
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of improving performance of a computer procurement application, comprising: receiving, by a processor, configuration data for procurement workflows from a plurality of client computer networks respectively associated with a plurality of entities, the configuration data comprising a plurality of configurations and corresponding values, the plurality of configurations including one or more of payment terms or tolerances; collecting values of Key Performance Indicators (KPIs) in the procurement workflows from the plurality of client computer networks, the KPIs being organized into one or more groups, the KPIs including one or more of a contract compliance rate, a supplier acknowledgement rate, an active supplier ratio, an e-invoice rate, or an invoice processing cost, at least one of the configurations being associated with at least one of the KPIs; determining, by the processor, a peer group for a first of the plurality of entities associated with a first of the plurality of client computer networks, the peer group comprising one or more of the plurality of entities that share common values for one or more attributes with the first entity; selecting one or more configurations in the configuration data provided by multiple of the client computer networks associated with the peer group, wherein values of the one or more configurations share specific characteristics; identifying one or more of the KPIs that are associated with the one or more configurations; comparing the values of the one or more configurations provided by the first client computer network with the values of the one or more configurations provided by the multiple client computer networks; analyzing values of the one or more KPIs collected from the first client computer network with respect to values of the one or more KPIs collected from the multiple client computer networks; determining a numerical relationship between the one or more KPIs and the one or more configurations using machine learning techniques;

creating a recommendation of updating the values of the one or more configurations provided by the first client computer network to improve the one or more KPIs for the first client computer network based on the comparing, the analyzing, and determining the numerical relationship; causing displaying a graphical user interface (GUI) configured to show, for one group of the one or more groups of KPIs that includes a specific KPI of the one or more KPIs, a description, a first aggregate value and a first value trend of the specific KPI based on values collected from the first client computer network, a second aggregate value and a second value trend of the specific KPI based on values collected from the multiple client computer networks, and an option or a link to the option to implement a portion of the recommendation associated with the specific KPI; receiving a selection of the option via the GUI; updating, in response to the selection, a value of one of the one or more configurations to implement the portion of the recommendation.

2. The computer-implemented method of claim 1, the collecting comprising: monitoring performance of the procurement workflows within at least one of the plurality of client computer networks; generating values for the KPIs based on the monitoring.

3. The computer-implemented method of claim 1, further comprising causing a display of data related to the recommendation, including one or more of: the values of the one or more configurations provided by the first client computer network, the values of the one or more configurations provided by the multiple client computer networks, the values of the one or more KPIs collected from the first client computer network, the values of the one or more KPIs collected from the multiple client computer networks, or the association between the one or more configurations and the one or more KPIs.

4. The computer-implemented method of claim 1, the one or more attributes including revenue, number of employees, or industry.

5. A computer-implemented method of improving performance of a computer procurement application, comprising: receiving, by a processor, configuration data for procurement workflows from a plurality of client computer networks respectively associated with a plurality of entities, the configuration data comprising a plurality of configurations and corresponding values, the plurality of configurations including one or more of payment terms or tolerances; collecting values of Key Performance Indicators (KPIs) in the procurement workflows from the plurality of client computer networks, the KPIs being organized into one or more groups, the KPIs including one or more of a contract compliance rate, a supplier acknowledgement rate, an active supplier ratio, an e-invoice rate, or an invoice processing cost, at least one of the configurations being associated with at least one of the KPIs; determining, by the processor, a peer group for a first of the plurality of entities associated with a first of the plurality of client computer networks, the peer group comprising one or more of the plurality of entities that share common values for one or more attributes with the first entity; receiving a goal value for one of the KPIs from the first client computer network; selecting one or more of the plurality of client computer networks associated with the peer group, wherein values of the one KPI collected from the one or more client computer networks have met the goal value; identifying one or more of the plurality of configurations that are associated with the one KPI; determining values of the one or more configurations provided by the one or more client computer networks; determining a numerical relationship between the one or more KPIs and the one or more configurations using machine learning techniques; creating a recommendation of updating the values of the one or more configurations provided by the first client computer network to meet the goal value for the one KPI for the first client computer network based on determining the values of the one or more configurations and determining the numerical relationship; causing displaying a graphical user interface (GUI) configured to show, for one group of the one or more groups of KPIs that includes the one KPI, a description, a first aggregate value and a first value trend of the one KPI based on values collected from the first client computer network, a second aggregate value and a second value trend of the one KPI based on values collected from the one or more client computer networks, and an option or a link to the option to implement the recommendation; receiving a selection of the option via the GUI; updating, in response to the selection, a value of one of the one or more configurations to implement the recommendation.

6. The computer-implemented method of claim 5, further comprising detecting that the value of the one KPI collected from the first client computer network falls below a threshold value, wherein the selecting is performed in response to the detecting.

7. The computer-implemented method of claim 5, the collecting comprising: monitoring performance of the procurement workflows within at least one of the plurality of client computer networks; generating values for the KPIs based on the monitoring.

8. The computer-implemented method of claim 5, further comprising causing a display of data related to the recommendation, including one or more of: the values of the one or more configurations provided by the first client computer network, the values of the one or more configurations provided by the multiple client computer networks, the values of the one or more KPIs collected from the first client computer network, or the association between the one or more configurations and the one or more KPIs.

9. The computer-implemented method of claim 5, the one or more attributes including one or more of revenue, number of employees, or industry.

10. A non-transitory computer-readable medium storing one or more instructions which, when executed by one or more processors, cause the one or more processors to perform a method of improving performance of a computer procurement application, the method comprising: receiving, by a processor, configuration data for procurement workflows from a plurality of client computer networks respectively associated with a plurality of entities, the configuration data comprising a plurality of configurations and corresponding values, the plurality of configurations including one or more of payment terms or tolerances; collecting values of Key Performance Indicators (KPIs) in the procurement workflows from the plurality of client computer networks, the KPIs being organized into one or more groups, the KPIs including one or more of a contract compliance rate, a supplier acknowledgement rate, an active supplier ratio, an e-invoice rate, or an invoice processing cost, at least one of the configurations being associated with at least one of the KPIs; determining, by the processor, a peer group for a first of the plurality of entities associated with a first of the plurality of client computer networks, the peer group comprising one or more of the plurality of entities that share common values for one or more attributes with the first entity; selecting one or more configurations in the configuration data provided by multiple of the client computer networks associated with the peer group, wherein values of the one or more configurations share specific characteristics; identifying one or more of the KPIs that are associated with the one or more configurations; comparing the values of the one or more configurations provided by the first client computer network with the values of the one or more configurations provided by the multiple client computer networks; analyzing values of the one or more KPIs collected from the first client computer network with respect to values of the one or more KPIs collected from the multiple client computer networks; determining a numerical relationship between the one or more KPIs and the one or more configurations using machine learning techniques; creating a recommendation of updating the values of the one or more configurations provided by the first client computer network to improve the one or more KPIs for the first client computer network based on the comparing, the analyzing, and determining the numerical relationship; causing displaying a graphical user interface (GUI) configured to show, for one group of the one or more groups of KPIs that includes a specific KPI of the one or more KPIs, a description, a first aggregate value and a first value trend of the specific KPI based on values collected from the first client computer network, a second aggregate value and a second value trend of the specific KPI based on values collected from the multiple client computer networks, and an option or a link to the option to implement a portion of the recommendation associated with the specific KPI; receiving a selection of the option via the GUI; updating, in response to the selection, a value of one of the one or more configurations to implement the portion of the recommendation.

11. The non-transitory computer-readable medium of claim 10, the collecting comprising: monitoring performance of the procurement workflows within at least one of the plurality of client computer networks; generating values for the KPIs based on the monitoring.

12. The non-transitory computer-readable medium of claim 10, further comprising causing a display of data related to the recommendation, including one or more of: the values of the one or more configurations provided by the first client computer network, the values of the one or more configurations provided by the multiple client computer networks, the values of the one or more KPIs collected from the first client computer network, the values of the one or more KPIs collected from the multiple client computer networks, or the association between the one or more configurations and the one or more KPIs.

13. A non-transitory computer-readable medium storing one or more instructions which, when executed by one or more processors, cause the one or more processors to perform a method of improving performance of a computer procurement application, the method comprising: receiving, by a processor, configuration data for procurement workflows from a plurality of client computer networks respectively associated with a plurality of entities, the configuration data comprising a plurality of configurations and corresponding values, the plurality of configurations including one or more of payment terms or tolerances; collecting values of Key Performance Indicators (KPIs) in the procurement workflows from the plurality of client computer networks, the KPIs being organized into one or more groups, the KPIs including one or more of a contract compliance rate, a supplier acknowledgement rate, an active supplier ratio, an e-invoice rate, or an invoice processing cost, at least one of the configurations being associated with at least one of the KPIs; determining, by the processor, a peer group for a first of the plurality of entities associated with a first of the plurality of client computer networks, the peer group comprising one or more of the plurality of entities that share common values for one or more attributes with the first entity; receiving a goal value for one of the KPIs from the first client computer network; selecting one or more of the plurality of client computer networks associated with the peer group, wherein values of the one KPI collected from the one or more client computer networks have met the goal value; identifying one or more of the plurality of configurations that are associated with the one KPI; determining values of the one or more configurations provided by the one or more client computer networks; determining a numerical relationship between the one or more KPIs and the one or more configurations using machine learning techniques; creating a recommendation of updating the values of the one or more configurations provided by the first client computer network to meet the goal value for the one KPI for the first client computer network based on determining the values of the one or more configurations and determining the numerical relationship; causing displaying a graphical user interface (GUI) configured to show, for one group of the one or more groups of KPIs that includes the one KPI, a description, a first aggregate value and a first value trend of the one KPI based on values collected from the first client computer network, a second aggregate value and a second value trend of the one KPI based on values collected from the one or more client computer networks, and an option or a link to the option to implement the recommendation; receiving a selection of the option via the GUI; updating, in response to the selection, a value of one of the one or more configurations to implement the recommendation.

14. The non-transitory computer-readable medium of claim 13, further comprising detecting that the value of the one KPI collected from the first client computer network falls below a threshold value, wherein the selecting is performed in response to the detecting.

15. The non-transitory computer-readable medium of claim 13, the collecting comprising: monitoring performance of the procurement workflows within at least one of the plurality of client computer networks; generating values for the KPIs based on the monitoring.

16. The non-transitory computer-readable medium of claim 13, further comprising causing a display of data related to the recommendation, including one or more of: the values of the one or more configurations provided by the first client computer network, the values of the one or more configurations provided by the multiple client computer networks, the values of the one or more KPIs collected from the first client computer network, or the association between the one or more configurations and the one or more KPIs.

* * * * *